(12) United States Patent
Chang

(10) Patent No.: US 7,455,487 B2
(45) Date of Patent: Nov. 25, 2008

(54) GYRATION BALANCING CALIBRATION FREE HIGH-SPEED BORING TOOL

(76) Inventor: Hsin-Tien Chang, No. 21, Lane 85, Yung Feng Road., Taiping City, Taichung Hsien (TW)

( * ) Notice: Subject to any disclaimer, the term of this patent is extended or adjusted under 35 U.S.C. 154(b) by 366 days.

(21) Appl. No.: 11/333,929

(22) Filed: Jan. 17, 2006

(65) Prior Publication Data
US 2007/0166117 A1 Jul. 19, 2007

(51) Int. Cl.
*B23B 29/02* (2006.01)
(52) U.S. Cl. .................. 408/143; 408/1 R; 408/239 R; 409/141; 29/407.08
(58) Field of Classification Search ............. 408/1 BD, 408/143, 239 R, 1 R; 409/141; 33/626; 29/407.01, 407.05, 407.008, 901; 464/180; *B23B 29/02*
See application file for complete search history.

(56) References Cited

U.S. PATENT DOCUMENTS

| | | | | |
|---|---|---|---|---|
| 2,780,467 A * | 2/1957 | Jackson | .................... | 279/6 |
| 2,812,672 A * | 11/1957 | Sainati et al. | ............... | 408/151 |
| 2,931,254 A * | 4/1960 | Briney, Jr. et al. | ............ | 408/151 |
| 2,991,667 A * | 7/1961 | Williams | .................... | 82/173 |
| 3,044,323 A * | 7/1962 | Sweeny | ...................... | 408/151 |
| 3,680,435 A * | 8/1972 | Deplante | ................... | 409/233 |
| 3,685,917 A * | 8/1972 | Patt | ............................ | 408/150 |
| 3,753,624 A * | 8/1973 | Walker et al. | ............... | 408/159 |
| 4,022,539 A * | 5/1977 | Peuterbaugh | ............... | 408/188 |
| 4,211,510 A * | 7/1980 | Hopkins | .................... | 408/186 |
| 4,507,027 A * | 3/1985 | Adamson et al. | ........... | 408/197 |
| 4,626,144 A * | 12/1986 | Berner | ....................... | 408/143 |
| 4,679,972 A * | 7/1987 | Andersson | .................. | 408/150 |
| 4,697,484 A * | 10/1987 | Klee et al. | .................... | 82/1.5 |
| 5,116,194 A * | 5/1992 | Pfalzgraf et al. | ............ | 408/181 |
| 5,249,895 A * | 10/1993 | Blaser | ........................ | 408/156 |
| 5,462,293 A * | 10/1995 | Samelius et al. | ........... | 279/4.03 |
| 6,322,299 B1 * | 11/2001 | Hartman | ...................... | 409/141 |
| 7,037,053 B2 * | 5/2006 | Matsumoto et al. | ......... | 409/234 |
| 7,309,194 B2 * | 12/2007 | Keefe et al. | .................. | 408/1 R |
| 7,393,164 B2 * | 7/2008 | Chen | .......................... | 409/141 |
| 2005/0074305 A1* | 4/2005 | Chang | ........................ | 408/150 |

* cited by examiner

*Primary Examiner*—David P Bryant
*Assistant Examiner*—Eric A Gates
(74) *Attorney, Agent, or Firm*—Banger Shia (57) ABSTRACT

A gyration balancing calibration fee high-speed boring tool, allowing fast replacement for boring bar bodies of different bore sizes, includes an adapter and a boring bar body; a micro-eccentric bore on the adapter to accommodates a pivoting shaft; a V-shaped ring groove being disposed on the pivoting shaft; both a securing hole and a positioning threaded hole being provided on the adapter, each provided with an eccentric positioning recess; a securing screw being disposed to a positioning pin and an elastic positioning screw for foolproof assembly; the boring bar body being tightly engaged with the adapter.

3 Claims, 13 Drawing Sheets

GYRATION BALANCING CALIBRATION FREE HIGH-SPEED BORING TOOL

BACKGROUND OF THE INVENTION (a) Field of the Invention

The present invention relates to a high-speed boring tool and the manufacturing process of the same; more particularly to a high-speed boring tool that dispenses with gyration balancing calibration in replacing boring bar body of a different bore size and that also includes a foolproof securing structure for fast replacement of boring bar body when fine-tuning bore sizes.

(b) Description of the Prior Art

Figure 19:
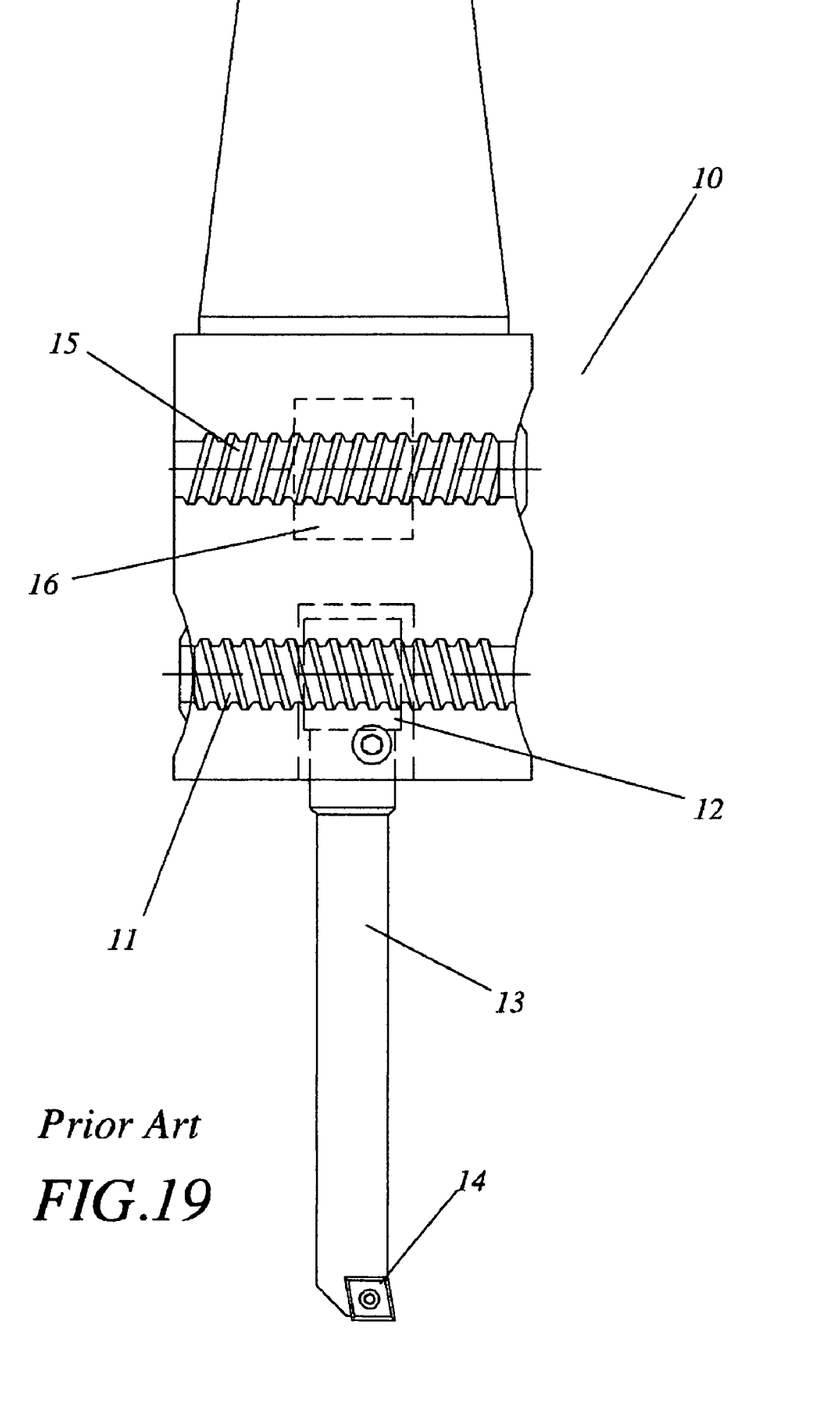
FIG. 19 is a layout of an adjustable boring tool of the prior art.

FIG. 19 of a prior art in the accompanying drawings, shows a bore-size adjustable boring tool 10: an adjusting screw drives a screw lock 12, and an adapter 13 changes the position of the tip of a disposable insert 14 when adjusting the bore size. However, once the position of the adapter 13 changes, the gyration balancing of the bore tool must be readjusted, too, to avoid making a bore of an imperfect circle as a result of boring at high revolving speed. Re-adjustment of the gyration balancing is in general made by means of a gyration balancing weight structure including an adjusting screw 15 and a weight 16. The position of the weight 16 is adjusted and placed on a gyration-balancing machine for calibration. Both the readjusting process and the examination of bored circles produced by a boring tool are time-consuming, thus requiring higher production cost. Some manufacturers try to reduce the 'off-target' threshold of a bored circle by reducing revolving speed (at approximately 2000 r/pm or revolution/per minute), which entails undesired consequences such as slower processing speed, more surface roughness, and reduced surface gloss.

Figure 16:
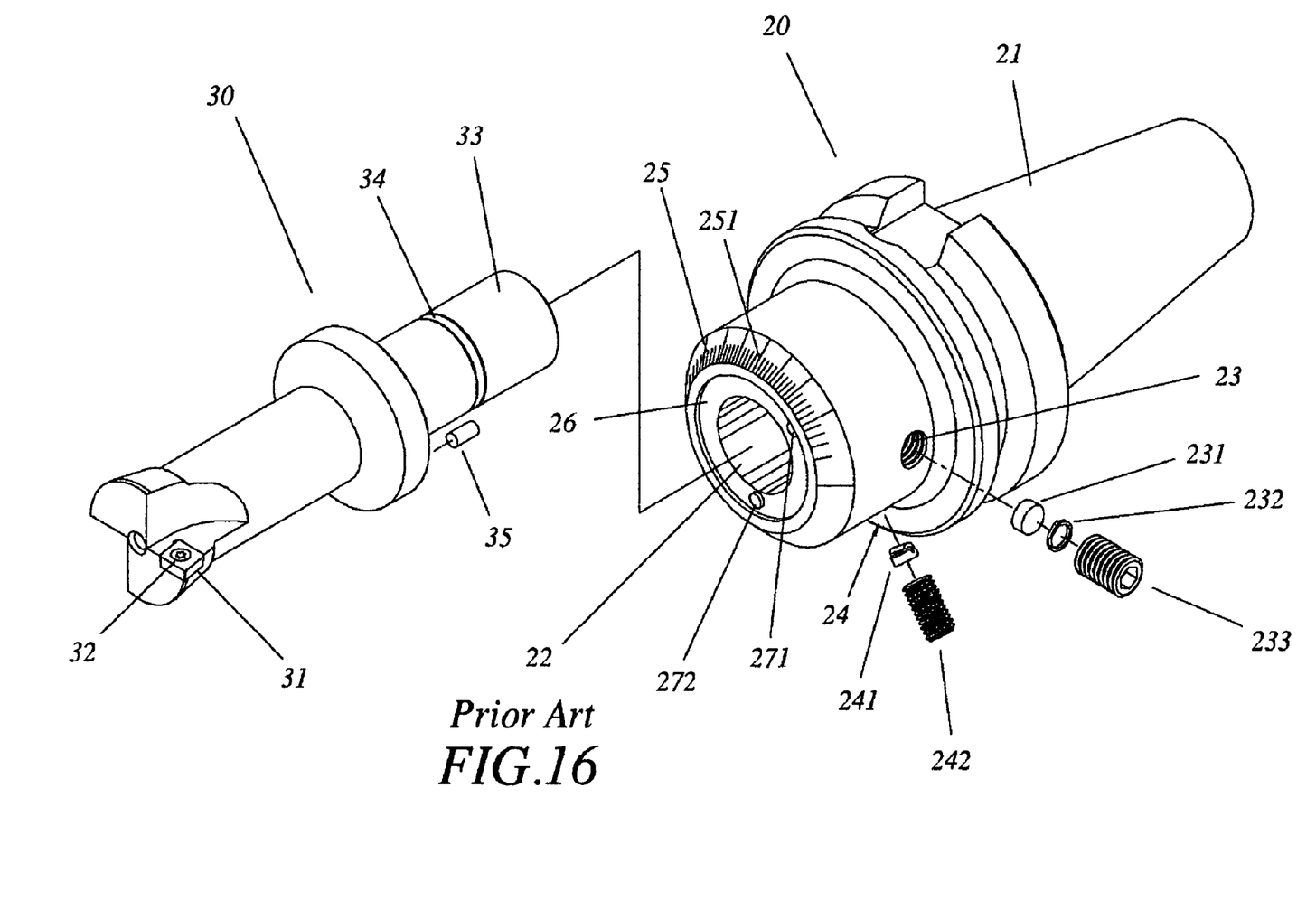
FIG. 16 is an exploded view of a U.S. application Ser. No. 10/680,061 by the applicant of the present invention.
Figure 17:
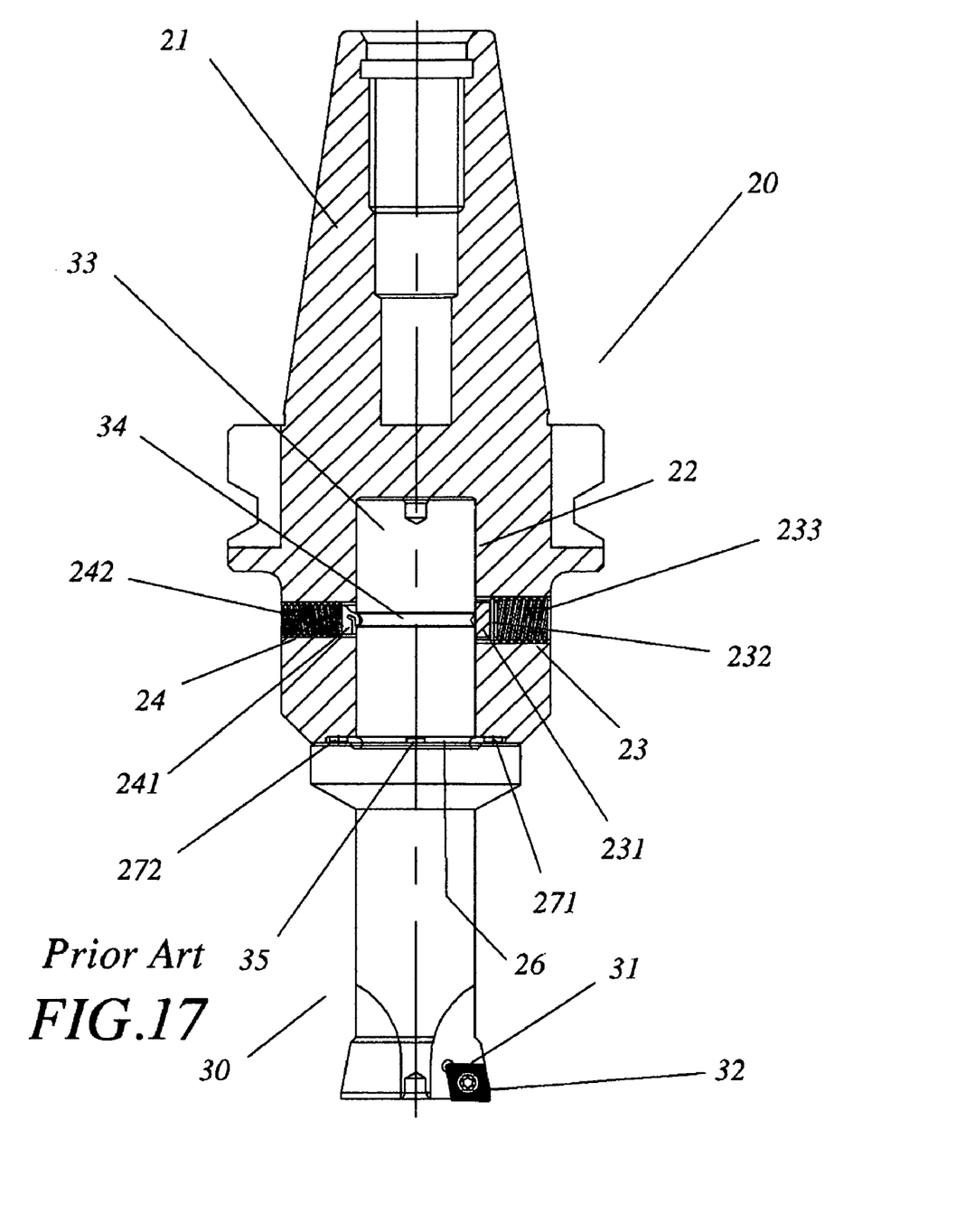
FIG. 17 is a sectional view of an assembly of the U.S. application Ser. No. 10/680,061 by the applicant of the present invention.
Figure 18:
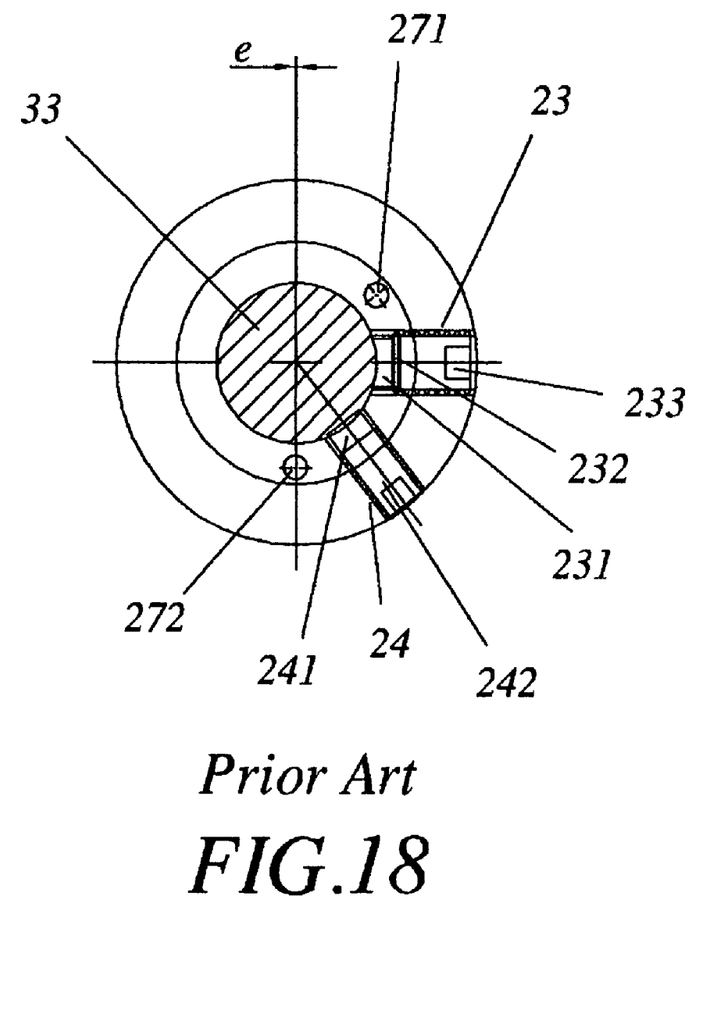
FIG. 18 is a sectional view showing an adapter and a boring bar body, each secured by a securing screw and a locating screw, respectively, in the U.S. application Ser. No. 10/680,061 by the applicant of the present invention.

FIGS. 16, 17, and 18, respectively, show a perspective view and two sectional views of U.S. application Ser. No. 10/680,061. There is no restriction in operational direction either in the engagement between a securing threaded hole 23' and a limiting block 231', or in the engagement between a positioning threaded hole 24' and an elastic positioning block 241' for an adapter 20'; instead, misplacement of the limiting block 231' for the elastic positioning block 241' (or vice versa) is avoided by way of different sizes of the securing threaded hole 23' and the positioning threaded hole 24', which are designed to be of different diameters. Whereas an elastic lever is disposed on the tip of the elastic positioning block and the support for the elastic lever must be provided on the top for a boring bar body 30' to tightly engage the adapter 20'; therefore, close engagement between a boring bar body 30' and the adapter 20' will not be possible when the elastic positioning block 241' is mounted in a reverse way.

Two limitation points 271' and 272' (in FIGS. 16, 17 and 18) on the end surface of the adapter include two inserted limiting pins. In the present invention, a fillister structure is provided in lieu of both inserted limiting pins in prior arts for easy of production and hence for reduced production cost while achieving the same purpose.

SUMMARY OF THE INVENTION

The primary purpose of the present invention is to improve on a U.S. application Ser. No. 10/680,061 (patent pending) by providing a high speed boring tool that dispenses with gyration balancing calibration when replacement needed for different bore sizes and that includes a foolproof securing structure to fine-tune the diameter of the bore by following the eccentric principle.

The boring tool of the present invention is essentially comprised of an adapter (20 in Figs.) and a boring bar body (30). The manufacturing process of the boring tool is as follows: after being assembled the boring tool is then given a one-time gyration balancing for calibration during the manufacturing process so that the gyration balancing will remain constant when afterwards replacing one boring bar body for another is necessary. In other words, a product manufactured in the way disclosed in the present invention can dispense with the gyration balancing calibration which always follows after the replacement of a boring bar body.

Details of the structure of the boring tool in the present invention is as follows. A micro-eccentric bore (22 in Figs) is disposed on the front of the adapter (20) to accommodate a pivoting shaft (of the boring bar body). A V-shaped ring groove (34) is disposed on the pivoting shaft. A securing threaded hole and a positioning threaded hole are both located on the adapter with the location of which corresponding to the V-shaped ring groove. An eccentric positioning recess is provided to each of the securing threaded hole and the positioning threaded hole. Each of the two eccentric positioning recess corresponds to each of the two locating pins, respectively, to avoid misplacement, wherein the two locating pins (42, and 53) are each disposed on the terminal of the positioning pin (40) and the elastic positioning pin (50). A securing screw (241) is eccentrically disposed in the positioning threaded hole (24). An elastic positioning pin (50) is received in the positioning pin (24) and is secured by a securing screw (24) to The elastic positioning pin (50) in the positioning threaded hole (24) is thus compressed by the securing screw (241), which pushes the boring bar body upward to tightly contact the adapter. The boring bar body (30) and the adapter (20) are thus firmly secured to each other in radius and axially.

BRIEF DESCRIPTION OF THE DRAWINGS

FIG. 11 is a schematic view showing t the position of the tip of the preferred embodiment of the present invention zeroed in.

DETAILED DESCRIPTION OF THE PREFERRED EMBODIMENTS

Referring to FIGS. 1, 2, 3, and 4, the present invention essentially includes an adapter 20, and a boring bar body 30. The term 'adapter' in the product claim of claim 2 changes to an alternative term of 'adapting piece' in the process claim of claim 1, simply for the purpose of being distinguishable in the two independent claims of claim 1 and claim 2 despite the fact that both 'adaper' in claim 2 and 'adapting piece' in claim 1 refers to the same part in this preferred embodiment. In the same manner, the term 'boring bar body' in the product claim of claim 2 also refers to the same object as the term 'front body' in the process claim of claim 1.

Figure 4:
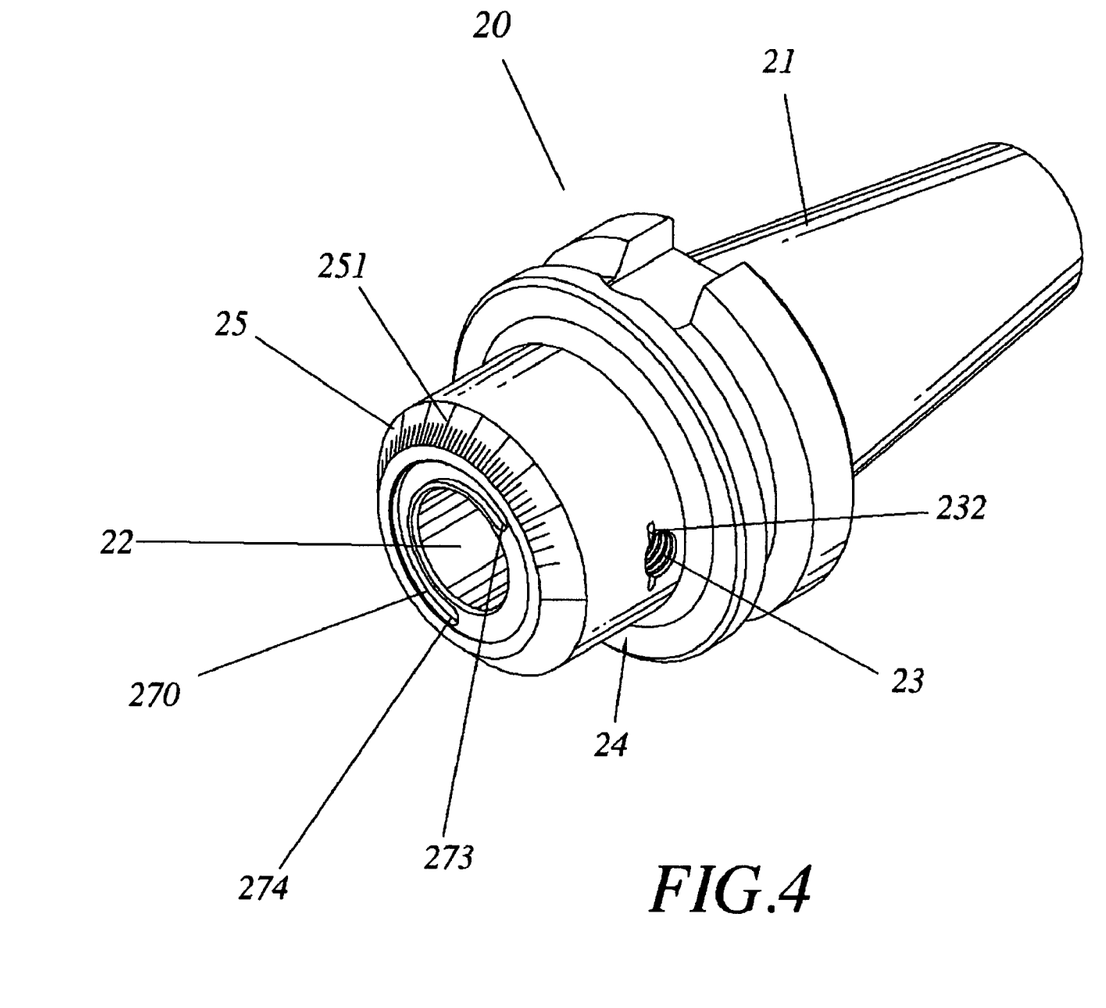
FIG. 4 is a perspective view of an adapter of a preferred embodiment of the present invention.

One end of the adapter 20 is disposed a BT40 tapering spindle 21 pivoted to a main shaft of a boring tool; and on the surface of another end (of the adapter 20) is disposed a micro-eccentric bore 22. A securing threaded hole 23 is provided on the tapering spindle 21 (of the micro-eccentric bore 22). One or more positioning slide 232 is disposed away from the center of the securing threaded hole 23. The securing threaded hole 23 contains a positioning pin 40 and a securing screw 231; the securing screw 231 is locked into the securing threaded hole 23. A positioning threaded hole 24 is disposed on the adapter 20 at a calculated location away from the securing threaded hole 23. The positioning threaded hole 24 includes one or more positioning slide 242, disposed away from the center of the positioning threaded hole 24. The positioning threaded hole 24 receives an elastic positioning pin 50 within and is secured with a positioning screw 241. Gradations 251 (as illustrated in FIG. 4) are provided on a pyramidal face 25 of the adapter 20, and a recess 270 is disposed at an inclination of approximately 270 degrees on the inner circumference of the pyramidal face 25. Both ends of the recess 270 define two limitation points 273 and 274.

At the front end of the boring bar body 30 is disposed an insert seat 31 to accommodate a disposable insert 32. At the other end of the boring bar body 30 is disposed a pivoting shaft 33, which is inserted into the micro-eccentric bore 22 of the boring bar body. A V-shape recess 34 corresponding to the securing threaded hole 23 to accommodate an elastic positioning pin 50. A limiting pin 35 is inserted at the top of the boring bar body 30, the position of which corresponds to both limitation points 271, and 272.

Figure 5:
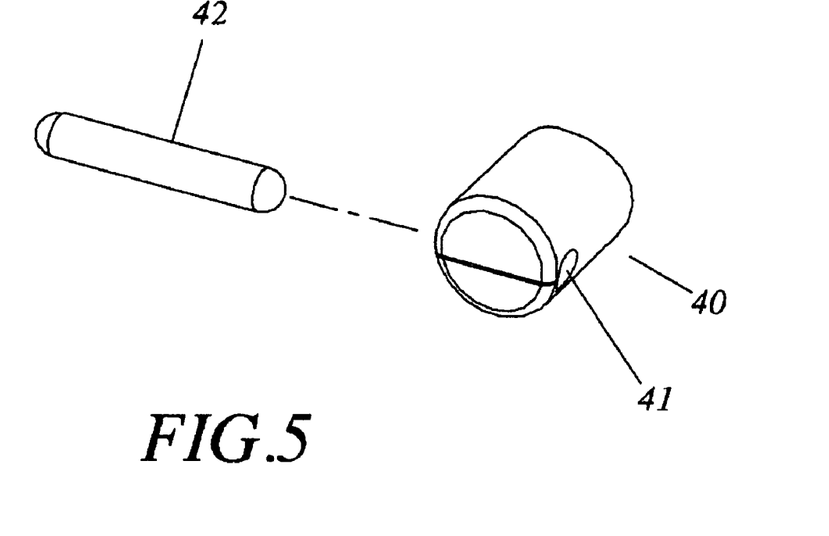
FIG. 5 is a perspective view of a positioning pin of the present invention.

As illustrated in FIG. 5, the front face of the positioning pin 40 is made with a concave arc shape with its circular curvature degree the same as that of the pivoting shaft 33 (of the boring bar body 30) for the face of the positioning pin 40 to mesh with the pivoting shaft 33. A pin hole 41, penetrating through the positioning pin 40 and deviating from the central shaft the positioning pin 40, is provided on the rear end of the positioning pin 40, to receive a positioning pin 42.

Figure 6:
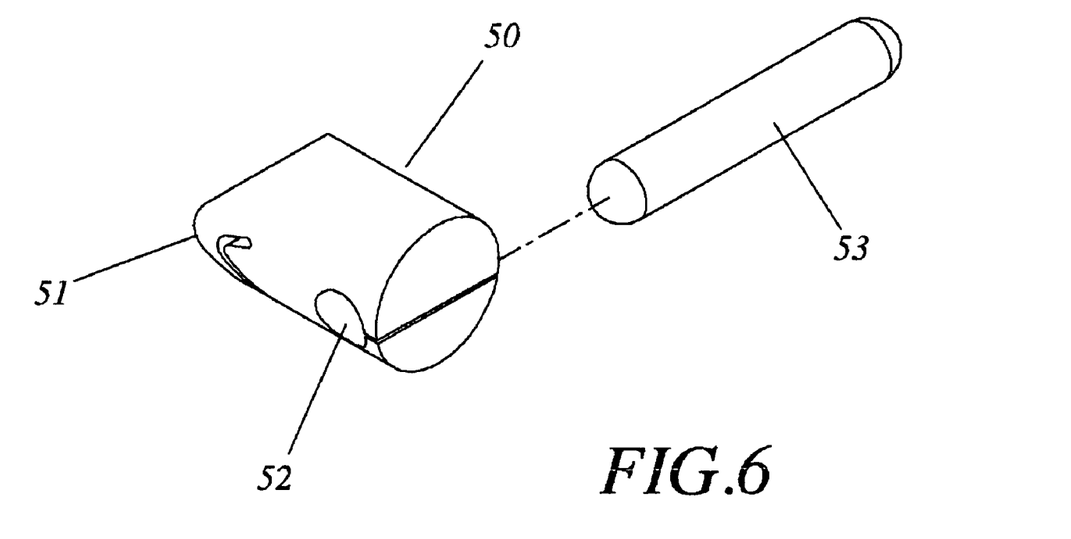
FIG. 6 is a perspective view of an elastic positioning pin of the present invention.

Now referring to FIG. 6, the elastic positioning pin 50 has at its front end a cut slot as an elastic arm 51; the elastic arm 5 has its balance point at its upper portion. A pin hole 52, penetrating through the elastic positioning pin 50, is provided on the side close to its terminal and deviating from its central shaft to receive a positioning pin 53.

Figure 8:
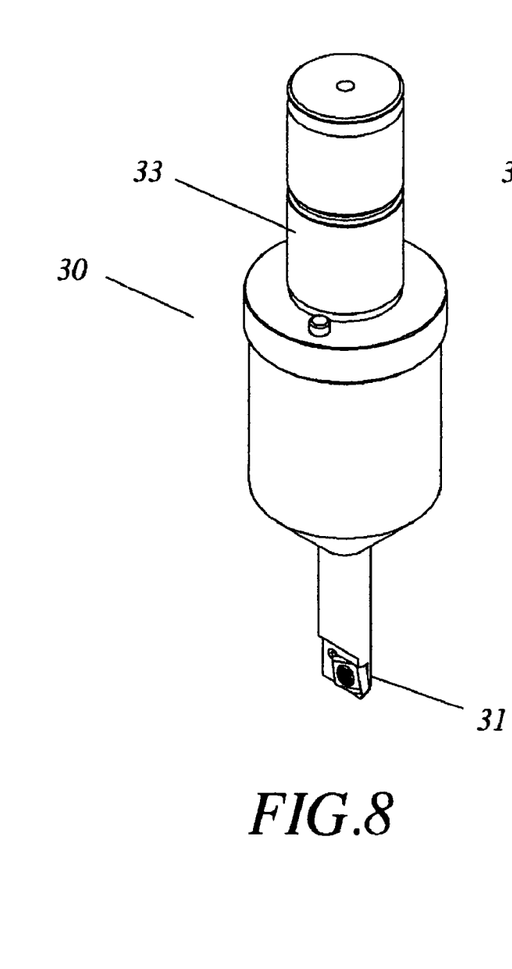
FIG. 8 is a perspective view of a boring bar body of a diameter of 10 mm.
Figure 9:
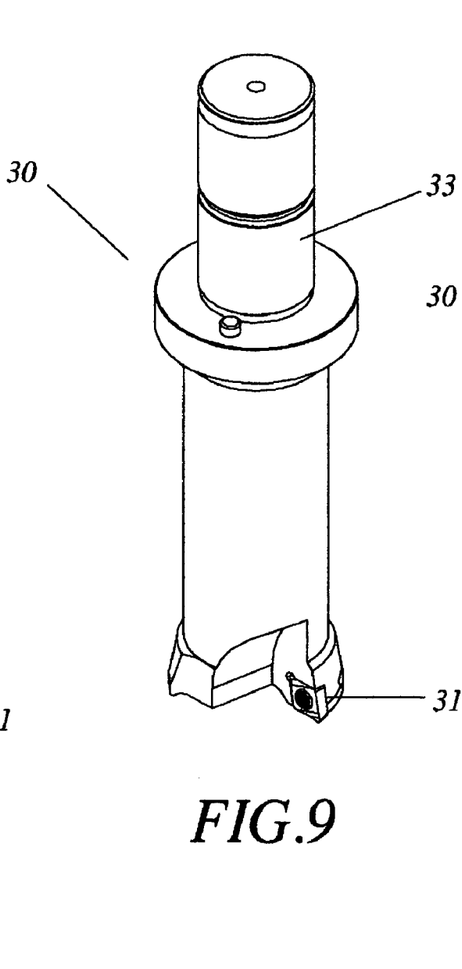
FIG. 9 is a perspective view of a boring bar body of a diameter of 30 mm.
Figure 10:
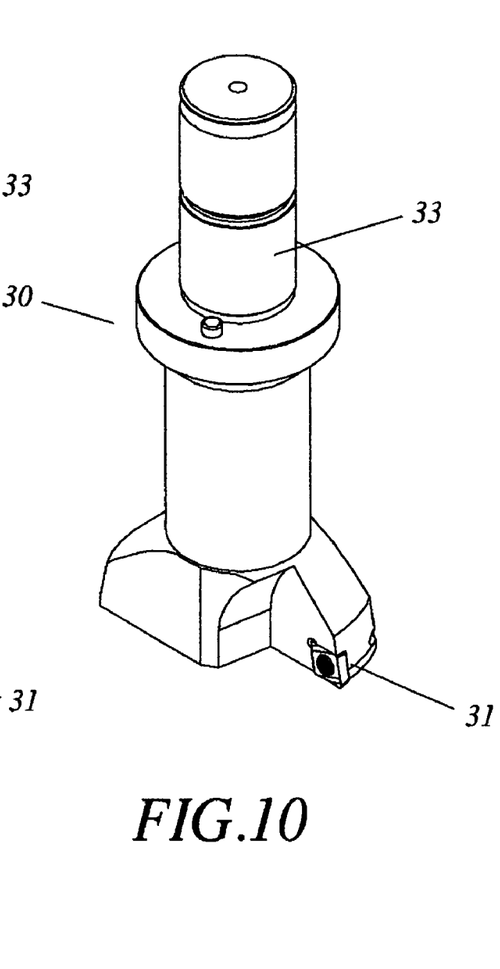
FIG. 10 is a perspective view of a boring bar body of a diameter of 50 mm.

To make sure gyration balancing being constant le when in operation (including the time when replacing the boring bar body 30 for different bore sizes), the following steps are executed:

1. The mass of the boring bar body 30 be a constant: Note that the position of the tool rest 31 changes due to different sizes of the boring bar body 30: the larger the bore size is, the larger and heavier the tool rest 31. For instance, boring bar bodies 30 with diameters of 10 mm, 30 mm, and 50 mm are illustrated in FIGS. 8, 9, and 10, respectively. The mass of boring bar bodies 30 of different diameters, nevertheless, must remain the same for maintaining stability of the boring tool revolving at high speed. Accordingly, both of the mass and shape of the boring bar body 30 must be adjusted. For example, the boring shaft body 30 of a diameter of 10 mm, as illustrated in FIG. 8, will have its tool rest 31 with a smaller size while the portion between the smaller tool rest 31 and the pivoting shaft 33 is increased to compensate for the reduced mass of a smaller tool rest 31. As for the boring shaft body 30 diameter of 30 mm illustrated in FIG. 9, both mass and size of its tool rest 31 are greater than those of that with a diameter of 10 mm, therefore the portion between the place right above the tool rest 31 and the pivoting shaft 33 is designed to be smaller for its mass to stay the same as that of the boring bar body 30 with a diameter of 10 mm. The greatest size of the tool rest 31 is found with the boring bar body 30 with a diameter of 50 mm as illustrated in FIG. 10, therefore, the portion between the place right above the tool rest 31 and the pivoting shaft 33 is reduced for having a constant mass for those boring bar bodies 30 with a diameter of 10 mm, 30 mm, and 50 mm To sum up, for any applicable bore sizes, the mass of the boring bar body either remains constant or falls within the deviations allowed.

2. Calibrating the boring bar body 30 so that its center of mass coincide with its center of shape. Having made sure that mass of boring bar body 30 of different bore sizes is a constant or falls within the deviations allowed the next step is calibrating the boring bar body so that t its center of mass coincides with its center of shape to prevent the boring bar body from an eccentric vibration when revolving at high speed (20000 rpm or higher). Boring bar body 30 of different bore sizes must be calibrated for its center of mass to coincide with its center of shape the calibration may be done with CAD package software and a gyration balancing machine. Completion of the calibration for the prototype makes possible mass production of boring bar bodies with the distinctive property of a constant gyration balancing.

3. Calibration of gyration balancing for the Adapter 20 and the Boring Bar Body 30: When the coring bar body 30 and the adapter 20 are assembled by means of a securing system, gyration balancing must be computed and calibrated again due to the presence of the micro-eccentric bore 22 and associated parts of the securing system; and again, the calibration may be made with CAD package software and the gyration balancing machine.

Upon completion of maintaining a constant mass and gyration balancing calibration for the boring tool in Step 3, the boring tool will maintain a stable operation at high speed of revolution without shaking or bias. Since the center of mass and center of shape coincides, the gyration balancing maintains constant when the boring bar body 30 is turned to fine-tune the bore size in replacement of boring bar bodies 30 of various diameters. Therefore, the boring process mentioned above yields bored circles of extreme high precision by the boring tool revolving at high speed. Furthermore, calibration of gyration balancing can be dispensed in replacing a boring bar body 30 of different diameters. Saving time in calibration is an important contribution of the present invention, which overcomes the problem of making gyration balancing calibration (for the boring bar body) whenever the bore size changes.

Figure 2:
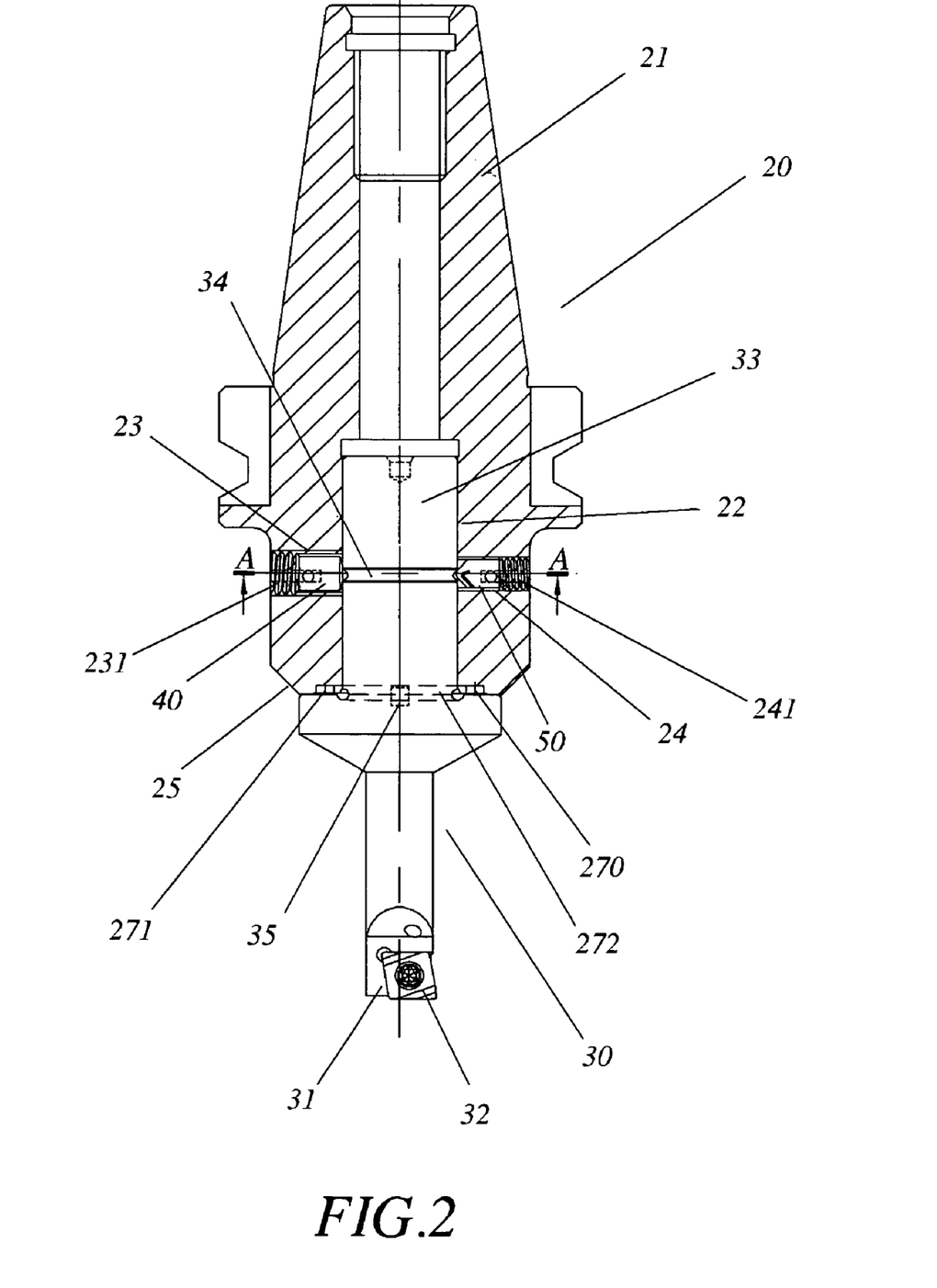
FIG. 2 is a sectional view of an assembled preferred embodiment of the present invention
Figure 3:
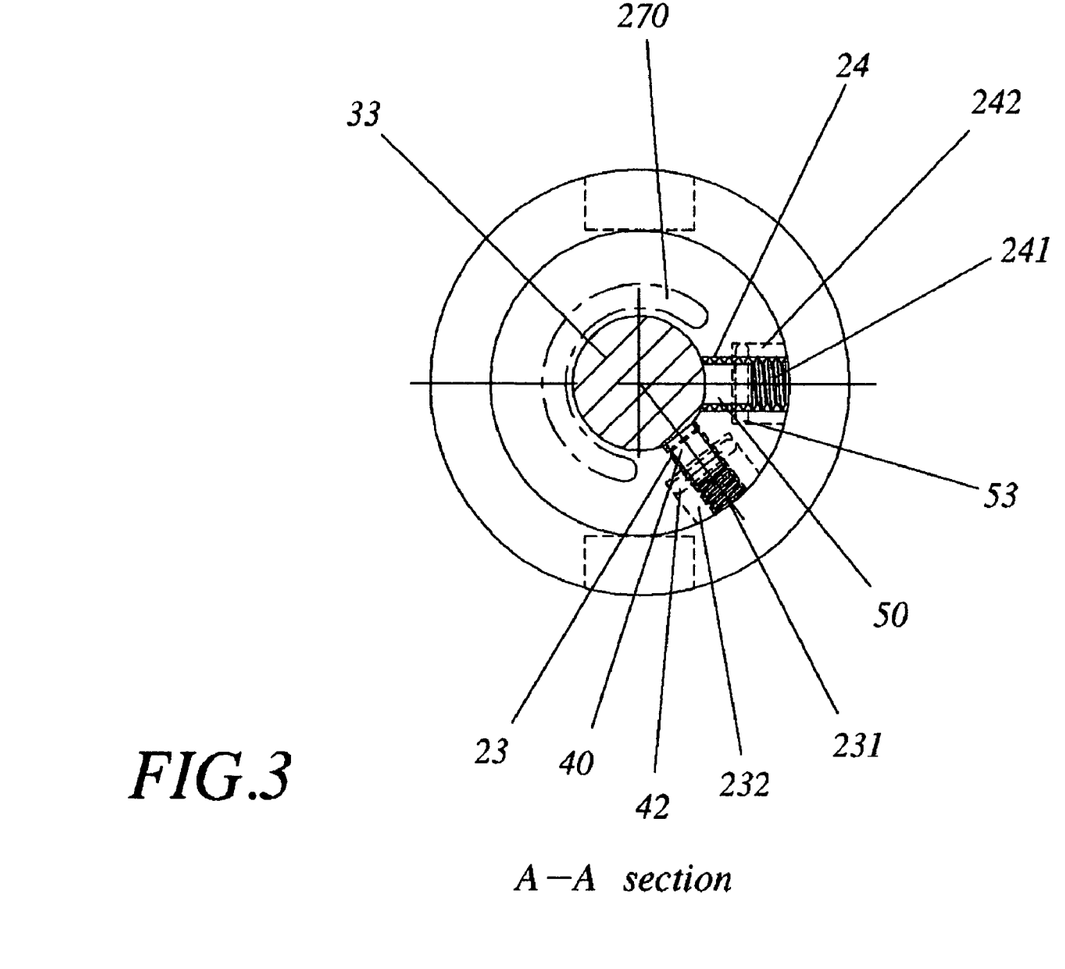
FIG. 3 is a sectional view taken from section A-A of a preferred embodiment of the present invention.
Figure 7:
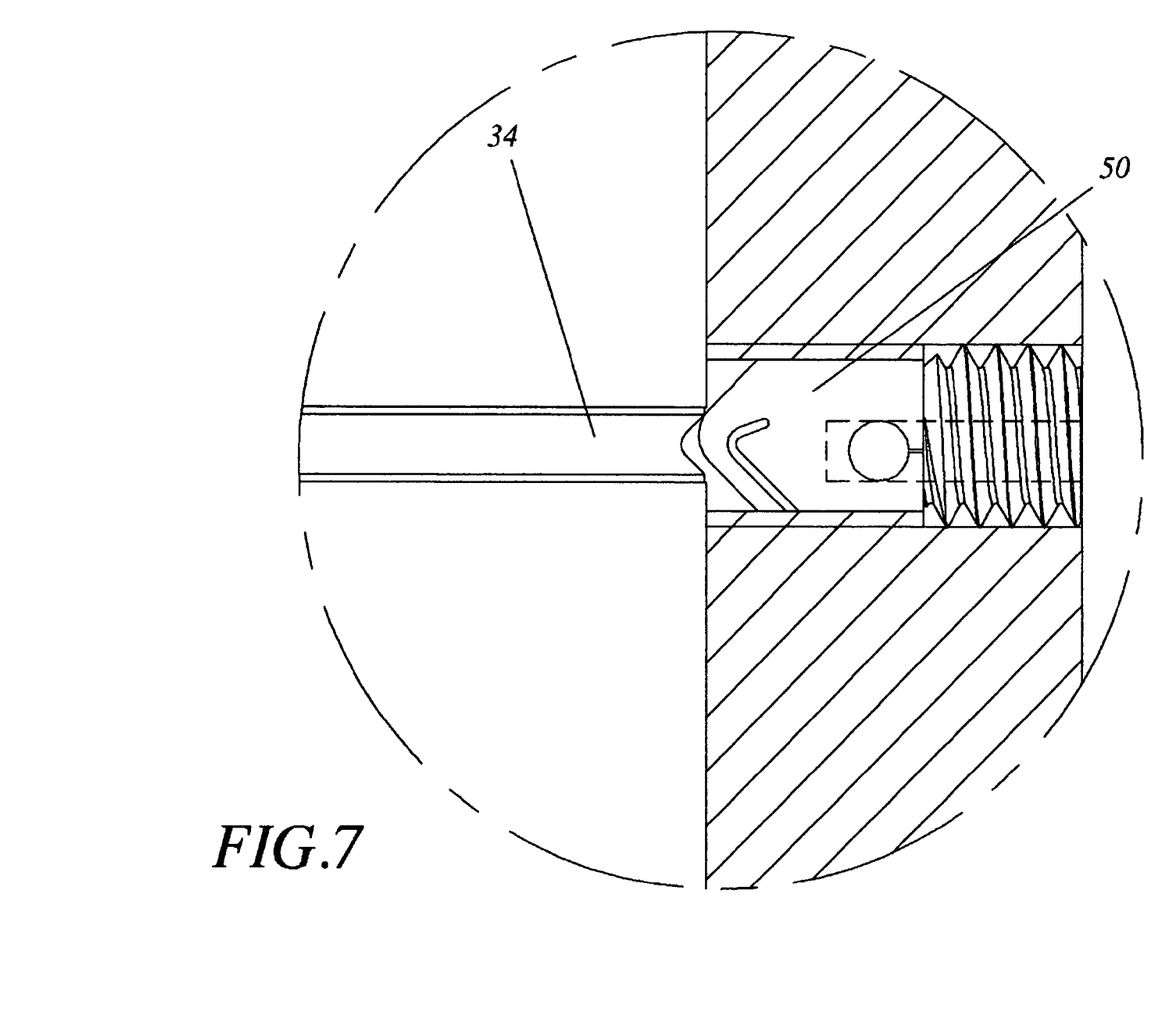
FIG. 7 is a magnified view of a local part showing the elastic positioning pin pushing a boring bar body of the present invention.

When securing the adapter 20 with the boring bar body 30 as illustrated in FIGS. 2, 3, and 7, the elastic positioning pin 50, being pushed by the moving positioning screw 241, gradually comes close to the V-shaped ring groove 34. As the positioning screw 241 drives in even further, the elastic positioning pin 50 is even more compressed to its elastic arm deformed under pressure and thus stores spring-loaded energy. The elastic arm of the positioning pin 50 deforms around its balance point and releases its spring-loaded energy in upward ejection around its balance point to push the boring bar body 30 to tightly engage with the adapter 20. Next, the limiting screw 231 (in the securing threaded hole 23) pushes the positioning pin 40 to pack together with the boring bar body 30. Both the positioning pin 40 and the boring bar body 30 are tightly engaged as an integral part since the curvature of the concave on the front of the positioning pin 40 is same as that of the boring bar body 30. Accordingly, the boring bar body 30 is firmly secured to the adapter 20 either in radius or axially (Z-axle) as an integral.

As illustrated in FIGS. 1, 2, 3 and 5, the present invention is easy for assembly and Wherein, both terminals of the positioning pin 40 and the elastic positioning pin 50 are eccentrically disposed with a locating pin 42, and 53, Respectively. The securing threaded hole 23 and the locating threaded hole 24 (on the adapter 20) include a positioning slide 232, and 242, respectively; both slides 232 and 242 are located away from the center of the threaded hole. The diameter of the securing threaded hole 23 is different from that of the positioning threaded hole 24. In the same manner, the diameter of the positioning pin 40 is also different from that of and the elastic locating pin 50 to prevent the risk of improper mounting. Meanwhile, the design of the positioning slides 232, and 242 makes it impossible to mount the elastic locating pin 50 in the wrong position (since the balance point of the elastic arm 51 must be positioned in the upper part to provide an upward push). The double foolproof design prevents incorrect mounting in assembling.

Figure 11:
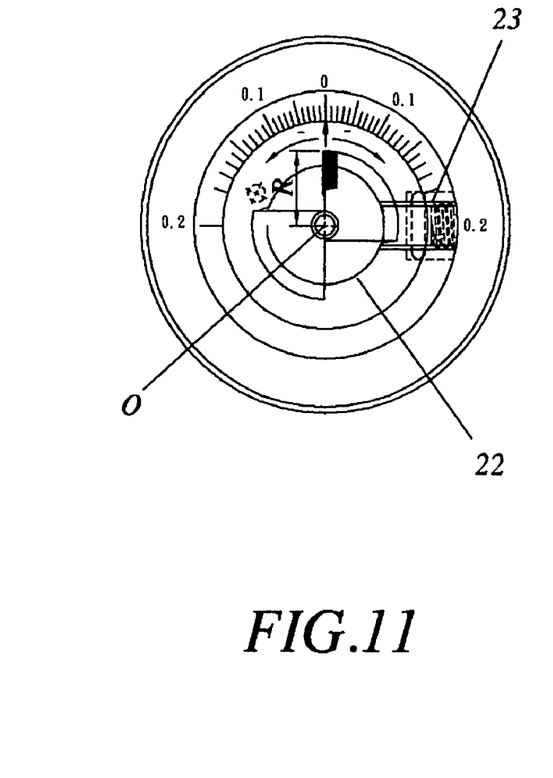

The fine-tuning maximum range of the bore size is described as follows:

1. Zero-in Position: as illustrated in FIG. 11, the zero-in position relates to the position for the zeroed in tool tip size of the tool. The micro-eccentric bore 22 is deflected to the left side of the central shaft, i.e., on the opposing side of the securing threaded hole 23 while the tip of the tool points exactly to the north, which is at a 90-degree. The range, r, between f the tip of the tool and the revolving center O is the gyration radius. The bore tool illustrated in FIG. 11 relates to one with a diameter of 25 mm. Therefore, the tool tip corresponds to the position where the bore size is zeroed in.

Figure 12:
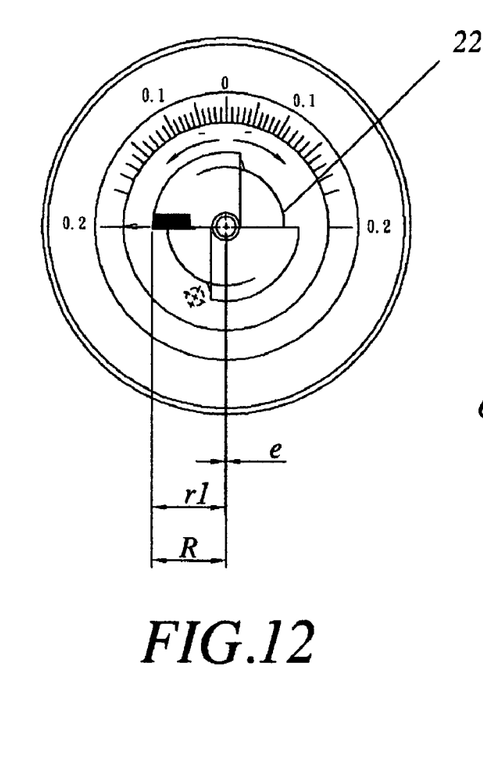
FIG. 12 is a schematic view showing the maximal CW in fine-tuning the bore at the position of the tip of the boring tool.

2. Maximal CW fine-tuned bore size: as illustrated in FIG. 12, the position of the tool tip is turned counterclockwise for 90 degrees to fall in the direction heading for where the micro-eccentric bore 22 is deflected. Therefore, the radius of the bore R=Deflection Amount e+Gyration radius, rl of the boring bar body. Given a boring bar body with a diameter of 25 mm of the preferred embodiment illustrated in FIG. 12, the deflection amount e is 0.1 mm; rl, 12.5 mm; bore radius, R, 12.6 mm; and maximal bore size, 25.2 mm.

Figure 13:
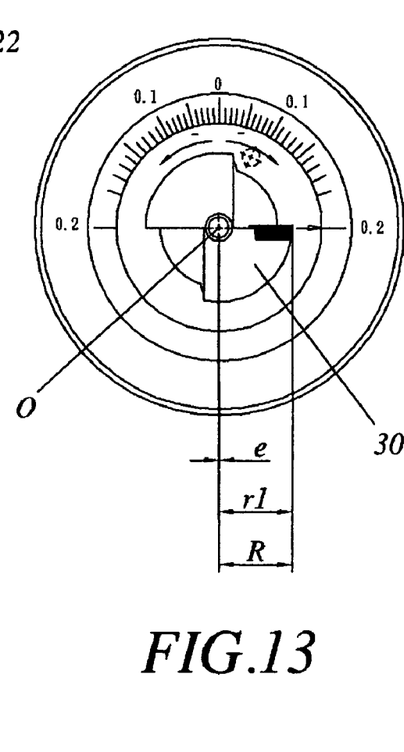
FIG. 13 is a schematic view showing the minimum CCW in fine-tuning the bore at the tip of the boring tool.

3. Minimum CCW fine-tuned bore size: referring to FIG. 13, the tip of the bore tool is turned clockwise to its right (or east direction) as illustrated, i.e., in the direction deflected to 0 degree. Since the center of the boring bar body 30 (which is also the center of the micro-eccentric bore 22) is located at the left of the gyration center O (which is also the center of the adapter 20), the radius of the bore R is reduced: R=Gyration radius, rl of the boring bar body−Deflection Amount e. For instance, in the preferred embodiment illustrated in FIG. 13, the bore radius Rx 12.5 mmx 0.1×12.4 mm; the bore size is 24.8 mm in diameter, i.e., 0.2 mm reduced in CCW direction.

As described above, the present invention is innovative and practical since a small deflection value, e, which is 0.1 mm, will bring forth either an increase or a decrease of 0.2 mm in CW or CCW direction for desired fine-tuned bore size.

Figure 1:
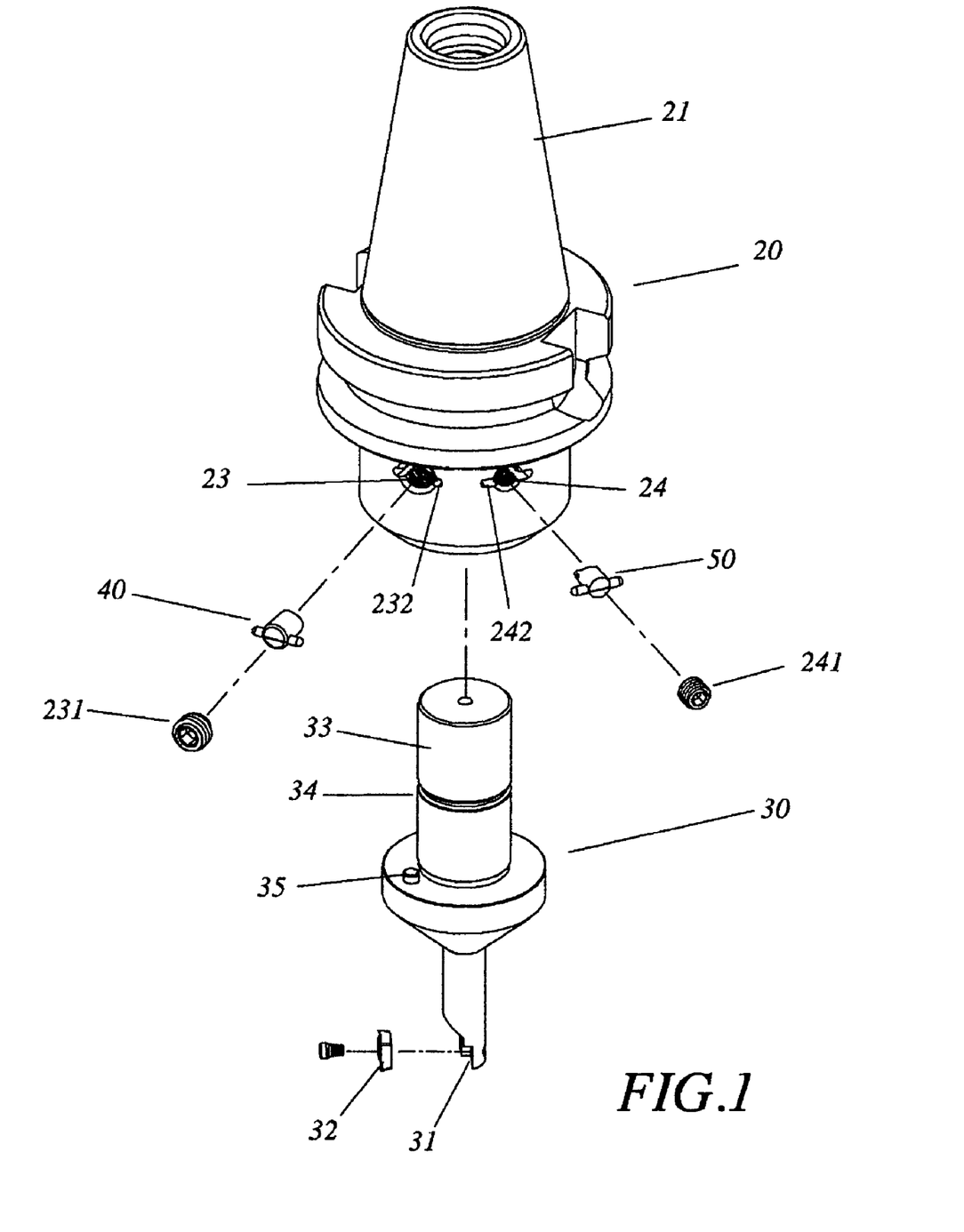
FIG. 1 is an exploded view of a preferred embodiment of the present invention.
Figure 14:
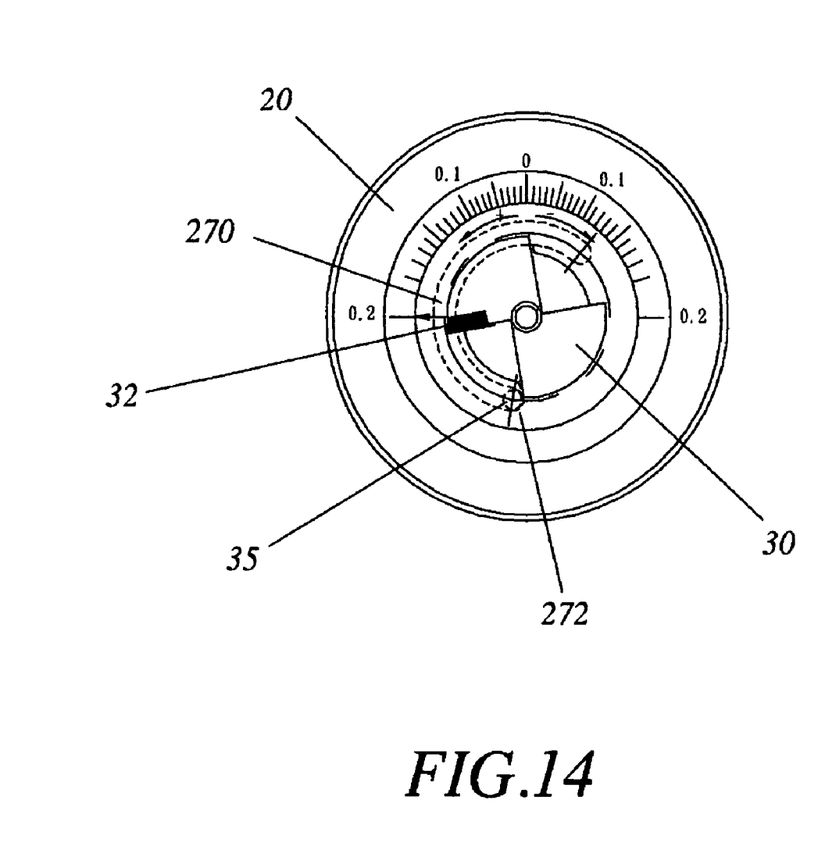
FIG. 14 is a schematic view showing CW inching limitation of the present invention.
Figure 15:
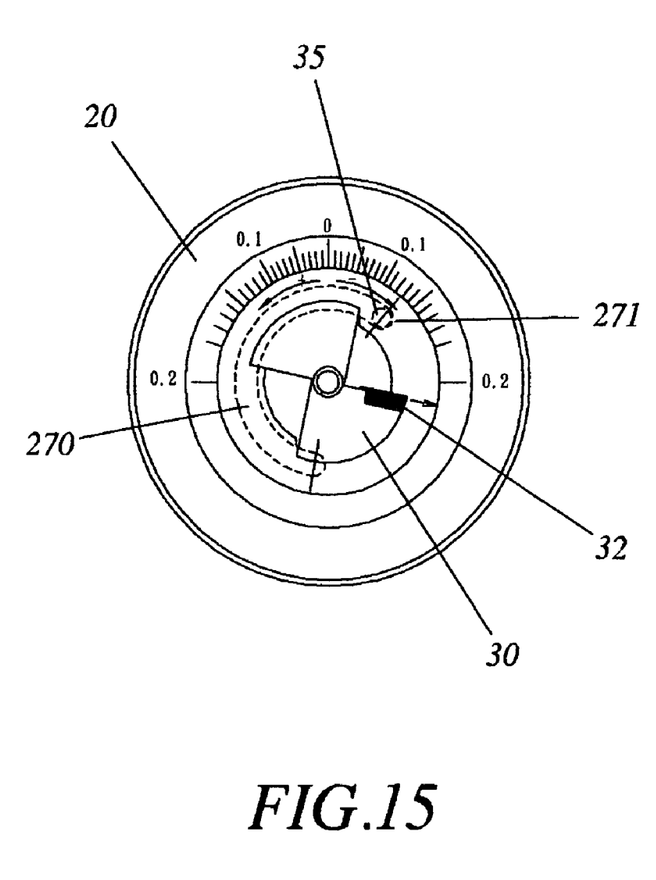
FIG. 15 is a schematic view showing CCW inching limitation of the present invention.

For safety design of limitation points as illustrated in FIGS. 1, 2, the boring bar body 30 and the adapter 20 are secured to each other by pushing together the positioning pin 40 and the elastic positioning pin 50 with the securing screw 231 and the locating screw 241, respectively. Without such a design of the limitation points, the insert 32 (upon contacting a work piece) will immediately stop gyration and force the boring bar body 30 to displace, thus causing the insert 32 to hit the work piece and break up itself if a user forgets to secure the boring bar body 30 after the bore size is fine tuned. As illustrated in FIGS. 14 and 15, the gyration range of the limiting pin 35 is the same fine-tuning range for the boring tool. FIG. 14 shows the fine-tuning limitation in CW direction; and FIG. 15, in CCW direction. Once the boring tool increases or decreases its fine-tuned size in CW or CCW direction, both limiting points 271, and 272 of the recess 270 serve as safety points to restrict movement of the limiting pin 35.

After fine-tuning, even if both of the securing screw 231 and the positioning screw 241 are accidentally not secured, the insert 32 of the boring bar body 30 (upon contacting the work piece) will cause the boring bar body 30 to stop gyration, whereas the adapter maintains its CW gyration, I causing the CCW limiting point 271 to hit the limiting pin 35 as illustrated in FIG. 15, and driving synchronously the boring bar body 30 to gyrate. Meanwhile, as the adapter is gyrating, the boring bar body 30 has already been fine-tuned in CCW direction and the tip of the boring tool will not reach all the way to the bore to hit the insert 32. For example, if the bore size is 25.1 mm in diameter for the work piece, the hole on the work piece should be manufactured with a size range of x 24.9~x 25 mm, whereas the size of the tip (of the boring tool for the insert 30 of the boring bar body 30) should be reduced to its minimum of x 24.8 mm. The boring bar body 30 is synchronously driven by the limiting pin 35 linked to the limiting pin 271, and the position of the tip of the insert is maintained at its position when the minimum cutting size takes place. Consequently, the insert 32 will not hit the work piece and hence will not break itself.

The present invention provides a boring tool that does not need further gyration balancing calibration upon requirement for different bore sizes; it is also designed with limiting points to protects the insert from hitting the work piece in case of a loosely secured screw. The preferred embodiment is reliably secured in both axial and radius directions by means of a positioning pin and an elastic positioning pin in conjunctions with screws; it is therefore capable of withstanding vibration in operation and loosening of parts; it is also foolproof designed to avoid incorrect assembly

I claim:

1. A high speed boring tool free of gyration balancing calibration and providing fast replacement as required for manufacturing different bore sizes, comprised of
    a central shaft,
    a tapering spindle, pivoted to said central shaft at one end thereof,
    an adapter, including a micro-eccentric bore, disposed at another end of said tapering spindle, an axis including said micro-eccentric bore thereon, a securing threaded hole with a center, disposed on and perpendicular to said axis of said micro-eccentric bore, one or multiple positioning slide biased from said center of said securing threaded hole and opening into said securing threaded hole, a threaded positioning hole with a center, disposed on said adapter at a proper angle biased from said securing threaded hole, one or multiple positioning slide member, biased from said center of said threaded positioning hole and opening into the threaded positioning hole, a recess, provided at an end surface of said adapter, said recess including two limiting ends, each defined by a limitation point and an axis parallel to said bore axis and through said limitation point; and
    a boring bar body, including an insert, an insert rest disposed at a front end of said boring bar body to receive said insert, a pivoting shaft, disposed at another end of said boring bar body and received in said micro-eccentric bore; a V-shaped ring groove, corresponding to said securing threaded hole and said threaded positioning hole when said boring bar body is positioned in said adapter; a limiting pin, parallel to said axis of said limitation point, being inserted into a top of said boring bar body; a positioning pin accommodated in said securing threaded hole, said positioning pin including a pin hole penetrating laterally through and adjacent to a front end to accommodate a first locating pin, said first locating pin being positioned in said positioning slide when said positioning pin is placed in said securing threaded hole; a securing screw to hold said positioning pin in said securing threaded hole; an elastic positioning pin accommodated in said threaded positioning hole to position said boring bar body relative to said adapter, said elastic positioning pin including a pin hole penetrating laterally through and adjacent to a front end to accommodate a second locating pin, said second locating pin being positioned in said positioning slide member when said elastic positioning pin is placed in said threaded positioning hole; and a positioning screw to hold said elastic positioning pin in said threaded positioning hole.

2. The boring tool of as claimed in claim 1, wherein the front end of said positioning pin is concave.

3. The boring tool as claimed in claim 1, wherein a slot is cut on the front end of said elastic positioning pin to define an elastic arm.

* * * * *